US009514356B2

United States Patent
Lu et al.

(10) Patent No.: US 9,514,356 B2
(45) Date of Patent: Dec. 6, 2016

(54) METHOD AND APPARATUS FOR GENERATING FACIAL FEATURE VERIFICATION MODEL

(71) Applicant: Huawei Technologies Co., Ltd., Shenzhen (CN)

(72) Inventors: Chaochao Lu, Hong Kong (HK); Chunjing Xu, Shenzhen (CN); Xiaoou Tang, Hong Kong (HK)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/841,928

(22) Filed: Sep. 1, 2015

(65) Prior Publication Data

US 2016/0070956 A1    Mar. 10, 2016

(30) Foreign Application Priority Data

Sep. 5, 2014   (CN) .......................... 2014 1 0451701

(51) Int. Cl.
*G06K 9/62* (2006.01)
*G06K 9/00* (2006.01)

(52) U.S. Cl.
CPC ....... *G06K 9/00288* (2013.01); *G06K 9/00268* (2013.01); *G06K 9/6232* (2013.01)

(58) Field of Classification Search
CPC .................. G06K 9/00221; G06K 2009/00328
See application file for complete search history.

(56) References Cited

U.S. PATENT DOCUMENTS 8,811,726 B2 * 8/2014 Belhumeur ........ G06K 9/00281
382/103

OTHER PUBLICATIONS

Chaochao Lu and Xiaoou Tang, "Learning the Face Prior for Bayesian Face Recognition", Department of Information Engineering The Chinese University of Hong Kong, Hong Kong, Aug. 29, 2014, Retrieved from the internet: URL:https://github.com/ChaoChao/Chao-Chao.github.io/blob/546d37b587f86d13c4cd7b551f18603070da0a79/papers/LearnedBayesian.pdf, 16.*

Lu, C., et al., "Learning the Face Prior for Bayesian Face Recognition," Department of Information Engineering, Retrieved from the Internet: URL:https://github.io/blob/546d37b587f86d13c4cd7b551f18603070da0a79/papers/learnedBayesian.pdf [retrieved on Jan. 7, 2016], Aug. 29, 2014, 16 pages.

(Continued)

*Primary Examiner* — Brian P Werner

(74) *Attorney, Agent, or Firm* — Conley Rose, P.C.

(57) ABSTRACT

A method and an apparatus for generating a facial feature verification model. The method includes acquiring N input facial images, performing feature extraction on the N input facial images, to obtain an original feature representation of each facial image, and forming a face sample library, for samples of each person with an independent identity, obtaining an intrinsic representation of each group of face samples in at least two groups of face samples, training a training sample set of the intrinsic representation, to obtain a Bayesian model of the intrinsic representation, and obtaining a facial feature verification model according to a preset model mapping relationship and the Bayesian model of the intrinsic representation. In the method and apparatus for generating a facial feature verification model in the embodiments of the present disclosure, complexity is low and a calculation amount is small.

10 Claims, 3 Drawing Sheets

(56) References Cited

OTHER PUBLICATIONS

Foreign Communication From A Counterpart Application, European Application No. 15180883.9, Extended European Search Report dated Jan. 15, 2016, 6 pages.
Ebden, M., et al., "Gaussian Processes for Regression: A Quick Introduction," Aug. 2008, 11 pages.
Damianou, A., et al., "Manifold Relevance Determination, Proceedings of the 29th International Conference on Machine Learning," 2012, 8 pages.
Rasmussen, C.E., et al., "Gaussian Processes for Machine Learning," Advanced Lectures on Machine Learning, vol. 3176 of the series Lecture Notes in Computer Science, 2006, 266 pages.
Bishop, C., "Pattern Recognition and Machine Learning," 2006, 703 pages.
Moghaddam, B., et al., "Bayesian Face Recognition," Mitsubishi Electric Research Laboratories, TR2000-42, Feb. 2002, 16 pages.
Chen, D., et al., "Bayesian Face Revisited: A Joint Formulation," Computer Vision, ECCV 2012, vol. 7574 of the series Lecture Notes in Computer Science, 14 pages.
Taigman, Y., et al., "DeepFace: Closing the Gap to Human-Level Performance in Face Verification," IEEE Conference on Computer Vision and Pattern Recognition, 2014, 8 pages.
Sun, Y., et al., "Deep Learning Face Representation from Predicting 10,000 Classes," CVPR '14 Proceedings of the IEEE Conference on Computer Vision and Pattern Recognition, 2014, 8 pages.
Wasserman, L., "All of Nonparametric Statistics," Springer Texts in Statistics, 2006, 292 pages.
Nabney, I., "Netlab: Algorithms for Pattern Recognition," Advances in Computer Vision and Pattern Recognition, 2002, 444 pages.

* cited by examiner

METHOD AND APPARATUS FOR GENERATING FACIAL FEATURE VERIFICATION MODEL

CROSS-REFERENCE TO RELATED APPLICATIONS

This application claims priority to Chinese Patent Application No. 201410451701.7, filed on Sep. 5, 2014, which is incorporated herein by reference in its entirety.

TECHNICAL FIELD

The present disclosure relates to image processing technologies, and in particular, to a method and an apparatus for generating a facial feature verification model.

BACKGROUND

Same to other biological features (such as a fingerprint and an iris) of a human body, a face and an identity of a person have a strong correspondence. A desirable property that a face is difficult to duplicate provides a necessary basis for identity authentication. Compared with other types of biological identification methods, a facial feature identification method has the following advantages: non-compulsory and non-contacting. Different from iris, fingerprint, and other authentication methods, the facial feature identification method does not require cooperation of a user, and can acquire a facial image of the user at a long distance to perform identification; and a single device may collect multiple faces at the same time and perform concurrent operations.

There are mainly two different application scenarios for facial feature identification technologies. One is face identity verification, and the other is face identity identification. The face identity verification refers to that two facial images are given, and it is determined whether identities of persons in the two facial images are of a same person. The face identity identification refers to that a database including multiple faces and corresponding identities is given, for a specified face, it is determined whether the specified face is of a same identity as a face in the database, and if yes, identity information of the face is given. Generally, the face identity verification is the basis of the face identity identification. A task of face identity identification can be completed by verifying, one by one, whether a specified face is of a same person as a face in a database.

In a process of face identity verification, a facial image becomes a sample x after certain preprocessing. In a case in which a sample set $x_1, \ldots, x_K$ is given, a discriminant function $f(\cdot, \cdot)$ is obtained through training by using a machine learning method. For two specified faces, two face samples $y_1, y_2$ are obtained, and whether the two face samples $y_1, y_2$ are of a same person or different persons is determined according to a value obtained by $f(y_1, y_2)$. A common method is that when $f(y_1, y_2) > 0$, the samples represent a person of a same identity; otherwise, the samples represent persons of different identities.

At present, there are many mainstream face identity verification technologies, and two of the face identity verification technologies are most successful at present: (1) a Bayesian modeling method, and (2) a deep learning method.

A main method of a Bayesian model includes the following basic parts: a model learning phase and a model testing phase. The model learning phase includes the following several steps. Prepare a training sample set: collecting a facial image set $V = \{v_1, \ldots, v_M\}$, where the M images come from N persons of different identities. Generally, $M \gg N$, each person corresponds to multiple different images in the image set, and M and N are both positive integers.

A sample set $X = \{x_1, \ldots, x_M\}$ is constructed by using the image set V, where $x_i = g(v_i)$, and g is a functional transformation, and an image $v_i$ is transformed into a digital vector $x_i$. Generally, g includes image preprocessing, for example, i) extracting a facial area from an image, ii) performing an operation of face alignment, and iii) extracting a particular feature from an aligned facial image area.

A face verification training sample set $\Delta = \{\delta_1, \delta_2, \ldots, \delta_L\}$. is constructed by using the face sample set, where $\delta_j = x_a - x_b$, $x_a, x_b \in X$.

A random variable that corresponds to a difference between two facial features is denoted as $\delta = x - y$. Probability models $p(\delta | \Omega_I)$, $p(\delta | \Omega_E)$ are obtained by learning the sample set $\Delta$. Herein, $\Omega_I$ and $\Omega_E$ separately represent assumptions whether $\delta$ is an intra-class change (a change of a person of a same identity shown in different images), or an inter-class change (a change of persons of different identities shown in different images). In a normal Bayesian model, $p(\delta | \Omega_I)$, $p(\delta | \Omega_E)$ are both preset as Gaussian distribution models, and an objective of model learning is to obtain parameters of the two Gaussian distribution models.

After the Bayesian model is obtained, steps of testing include the following. For two given images $v_\alpha, v_\beta$, digital vectors $x_\alpha, x_\beta$ are obtained after the same functional transformation g as in the training phase. $\delta_{\alpha\beta} = x_\alpha - x_\beta$, $$S(\delta_{\alpha\beta}) = \log\left(\frac{p(\delta_{\alpha\beta} | \Omega_I)}{p(\delta_{\alpha\beta} | \Omega_E)}\right)$$

is calculated by using the probability models $p(\delta | \Omega_I)$, $p(\delta | \Omega_E)$.

If $S(\delta_{\alpha\beta}) > 0$, the samples come from a person of a same identity; otherwise, the samples come from persons of different identities.

The foregoing descriptions are application steps of a classical Bayesian model. The classical Bayesian model has the following several obvious defects. The model is based on a difference between feature representations of two input faces, some discrimination information is lost, and distinguishability of samples is reduced. $p(\delta | \Omega_I)$, $p(\delta | \Omega_E)$ are assumed as Gaussian models, which is a kind of excessively simplified processing in actual use. A Gaussian model cannot entirely process a difference of posture, illumination, expression, age, blockage, hairstyle, or the like between different facial images.

When the deep learning method is used for face identity verification, an effective digital feature expression of a face is mainly learned by using a deep network, that is, a function g is simulated by using the deep network, and an input (an original facial image or an extracted feature) of a neural network is transformed into a more effective digital feature x, so as to facilitate further identity verification. For two input images $v_\alpha$ and $v_\beta$, digital feature expressions $x_\alpha$ and $x_\beta$ are obtained by using a deep neural network. After $x_\alpha$ and $x_\beta$ are obtained, $x_\alpha$ and $x_\beta$ are used as inputs. Multiple classification methods may be used to map a feature pair $(x_\alpha, x_\beta)$ to two types {a same person, different persons}. For example, the above-described Bayesian method may be used for implementation, or a relative simple classification method, such as Soft-max or support vector machines (SVM), may be used to classify features.

The deep neural network model has an advantage of desirable discrimination performance, but also has very serious defects. Main defects of the deep neural network model lie in two aspects. The model is highly complex, and the model has a large quantity of parameters, which are inconvenient to store. A quantity of model parameters generally involved is about 12 million. A calculation amount for testing is also large, making implementation at a terminal difficult. An excessively huge amount of training data is needed, which is a common problem for a deep-learning-based technical framework. A quantity of marked images involved in training reaches millions. Lots of manpower and material resources are needed to collect, mark, and check related image data.

SUMMARY

In view of this, to solve the foregoing problem, embodiments of the present disclosure provide a method and an apparatus for generating a facial feature verification model. In the method and apparatus for generating a facial feature verification model in the embodiments of the present disclosure, a model that is obtained through learning of an intrinsic representation has strong representability and discrimination performance during processing of intra-class and inter-class changes of posture, illumination, expression, age, and the like under different photographing scenarios; a learning model has a low error rate in facial image verification, and is close to an identification level of a human eye in a standard Internet image test; the model has low complexity and a small calculation amount.

According to a first aspect, the present disclosure provides a method for generating a facial feature verification model, and the method includes acquiring N input facial images, where the N input facial images correspond to M persons with independent identities, N is an integer greater than 2, and M is an integer greater than 2, performing feature extraction on the N input facial images, to obtain an original feature representation of each facial image, and forming a face sample library according to obtained original feature representations, grouping samples corresponding to one person with an independent identity in the face sample library, to obtain c groups of face samples, where c is an integer greater than or equal to 2, for samples of each person with an independent identity, obtaining a common intrinsic representation of the c groups of face samples according to manifold relevance determination, obtaining a training sample set of an intrinsic representation according to the common intrinsic representation of the c groups of face samples of the person with an independent identity in the M persons with independent identities, training the training sample set of the intrinsic representation, to obtain a Bayesian model of the intrinsic representation, and obtaining a facial feature verification model according to a preset model mapping relationship and the Bayesian model of the intrinsic representation.

With reference to the first aspect, in a first implementation manner, the obtaining a common intrinsic representation of the c groups of face samples according to manifold relevance determination includes a quantity of face samples in each group of the c groups of face samples being the same, and obtaining, according to a preset likelihood function and the manifold relevance determination, a private intrinsic representation of each group of face samples in the c groups of face samples and the common intrinsic representation of the c groups of face samples.

With reference to the first aspect, in a second implementation manner, for one person with an independent identity, the obtaining a training sample set of an intrinsic representation according to the common intrinsic representation of the c groups of face samples includes obtaining a positive training sample set and a negative training sample set according to the obtained common intrinsic representation of the c groups of face samples, where one training sample pair in the positive training sample set comes from a same person, and one training sample pair in the negative training sample set comes from different persons, and correspondingly, the training the training sample set of the intrinsic representation, to obtain a Bayesian model of the intrinsic representation includes training the positive training sample set and the negative training sample set, to obtain the Bayesian model of the intrinsic representation.

With reference to any one foregoing embodiment of the embodiments of the first aspect of the present disclosure, in a third possible implementation manner, the training the training sample set of the intrinsic representation, to obtain a Bayesian model of the intrinsic representation includes training the training sample set of the intrinsic representation according to an expectation-maximization algorithm, to obtain the Bayesian model of the intrinsic representation.

With reference to any one of foregoing embodiment of the embodiments of the first aspect of the present disclosure, in a fourth possible implementation manner, the obtaining a facial feature verification model according to a preset model mapping relationship and the Bayesian model of the intrinsic representation includes mapping the Bayesian model of the intrinsic representation by means of Gaussian process regression of the preset model mapping relationship, to obtain a Bayesian model of an original feature representation, where the Bayesian model of the original feature representation is the facial feature verification model.

According to a second aspect, an embodiment of the present disclosure discloses an apparatus for generating a facial feature verification model, and the apparatus includes an acquiring module configured to acquire N input facial images, where the N input facial images correspond to M persons with independent identities, N is an integer greater than 2, and M is an integer greater than 2, a feature extracting module configured to perform feature extraction on the N input facial images, to obtain an original feature representation of each facial image, and form a face sample library according to obtained original feature representations, a grouping module configured to group samples corresponding to one person with an independent identity in the face sample library, to obtain c groups of face samples, where c is an integer greater than or equal to 2, a module for generating a Bayesian model of an intrinsic representation configured to, for samples of each person with an independent identity, obtain a common intrinsic representation of the c groups of face samples according to manifold relevance determination, obtain a training sample set of an intrinsic representation according to the obtained common intrinsic representation of the c groups of face samples, and train the training sample set of the intrinsic representation, to obtain a Bayesian model of the intrinsic representation, and a module for generating a facial feature verification model configured to obtain a facial feature verification model according to a preset model mapping relationship and the Bayesian model of the intrinsic representation.

With reference to the second aspect, in a first implementation manner, the module for generating a Bayesian model of an intrinsic representation is configured to, for the samples of each person with an independent identity, obtain, according to a preset likelihood function and the manifold relevance determination, a private intrinsic representation of each group of face samples in the c groups of face samples and the common intrinsic representation of the c groups of face samples, where a quantity of face samples in each group of the c groups of face samples is the same, obtain the training sample set of the intrinsic representation according to the obtained common intrinsic representation of the c groups of face samples, and train the training sample set of the intrinsic representation, to obtain the Bayesian model of the intrinsic representation.

With reference to the second aspect, in a second implementation manner, the module for generating a Bayesian model of an intrinsic representation is configured to, for the samples of each person with an independent identity, obtain the common intrinsic representation of the c groups of face samples according to the manifold relevance determination, obtain a positive training sample set and a negative training sample set according to the obtained common intrinsic representation of the c groups of face samples, where one training sample pair in the positive training sample set comes from a same person, and one training sample pair in the negative training sample set comes from different persons, and train the positive training sample set and the negative training sample set, to obtain the Bayesian model of the intrinsic representation.

With reference to the second aspect, in a third implementation manner, the module for generating a Bayesian model of an intrinsic representation is configured to, for the samples of each person with an independent identity, obtain the common intrinsic representation of the c groups of face samples according to the manifold relevance determination, obtain the training sample set of the intrinsic representation according to the obtained common intrinsic representation of the c groups of face samples, and train the training sample set of the intrinsic representation according to an expectation-maximization algorithm, to obtain the Bayesian model of the intrinsic representation.

With reference to any one foregoing embodiment of the embodiments of the second aspect of the present disclosure, in a fourth possible implementation manner, the module for generating a facial feature verification model is configured to map the Bayesian model of the intrinsic representation by means of Gaussian process regression of the preset model mapping relationship, to obtain a Bayesian model of an original feature representation, where the Bayesian model of the original feature representation is the facial feature verification model. In the method and apparatus for generating a facial feature verification model in the embodiments of the present disclosure, a model that is obtained through learning of an intrinsic representation has strong representability and discrimination performance during processing of intra-class and inter-class changes of posture, illumination, expression, age, and the like under different photographing scenarios; a learning model has a low error rate in facial image verification, and is close to an identification level of a human eye in a standard Internet image test; the model has low complexity and a small calculation amount.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

A method for generating a facial feature verification model in an embodiment of the present disclosure is described below with reference to FIG. 1.

Figure 1:
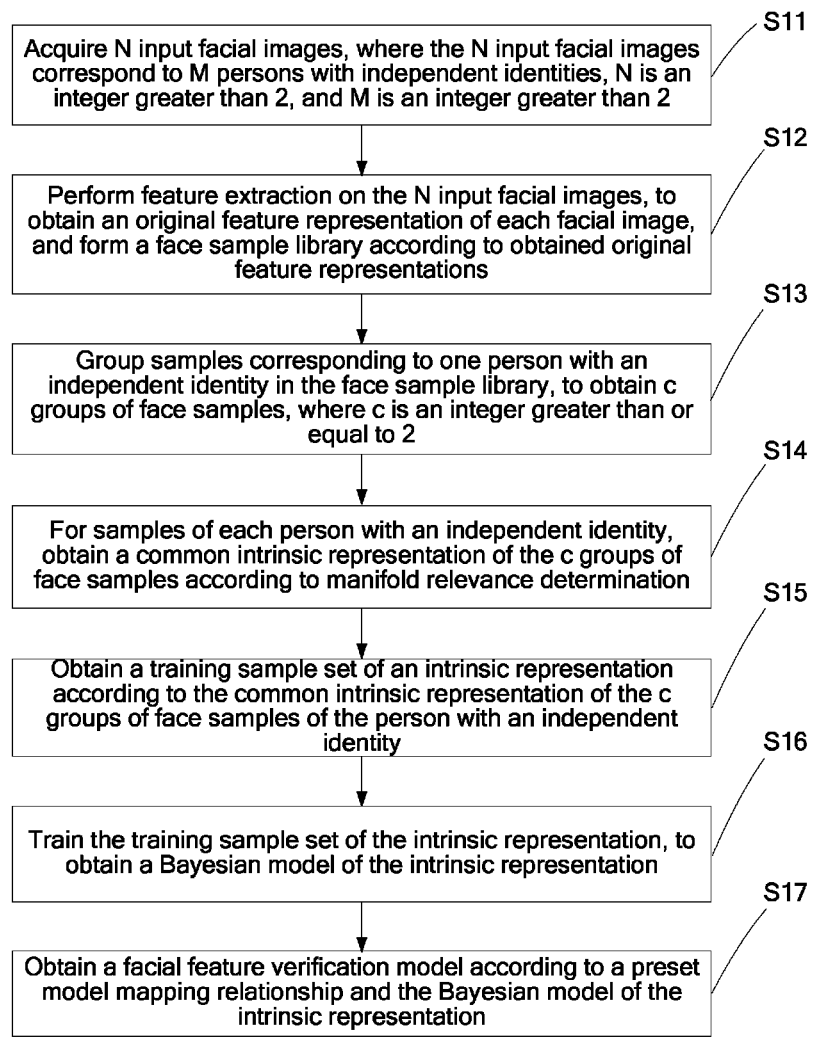
FIG. 1 is a flowchart of a method for generating a facial feature verification model according to an embodiment of the present disclosure.

As shown in FIG. 1, the method for generating a facial feature verification model mainly includes S11: Acquire N input facial images, where the N input facial images correspond to M persons with independent identities, N is an integer greater than 2, and M is an integer greater than 2.

S12: Perform feature extraction on the N input facial images, to obtain an original feature representation of each facial image, and form a face sample library according to obtained original feature representations.

S13: Group samples corresponding to one person with an independent identity in the face sample library, to obtain c groups of face samples, where c is an integer greater than or equal to 2.

S14: For samples of each person with an independent identity, obtain a common intrinsic representation of the c groups of face samples according to manifold relevance determination.

S15: Obtain a training sample set of an intrinsic representation according to the common intrinsic representation of the c groups of face samples of the person with an independent identity.

S16: Train the training sample set of the intrinsic representation, to obtain a Bayesian model of the intrinsic representation.

S17: Obtain a facial feature verification model according to a preset model mapping relationship and the Bayesian model of the intrinsic representation.

In the method for generating a facial feature verification model in this embodiment of the present disclosure, a model that is obtained through learning of an intrinsic representation has strong representability and discrimination performance during processing of intra-class and inter-class changes of posture, illumination, expression, age, and the like under different photographing scenarios; a learning model has a low error rate in facial image verification, and is close to an identification level of a human eye in a standard Internet image test; the model has low complexity and a small calculation amount.

A method for generating a facial feature verification model in an embodiment of the present disclosure is described below with reference to FIG. 2.

Figure 2:
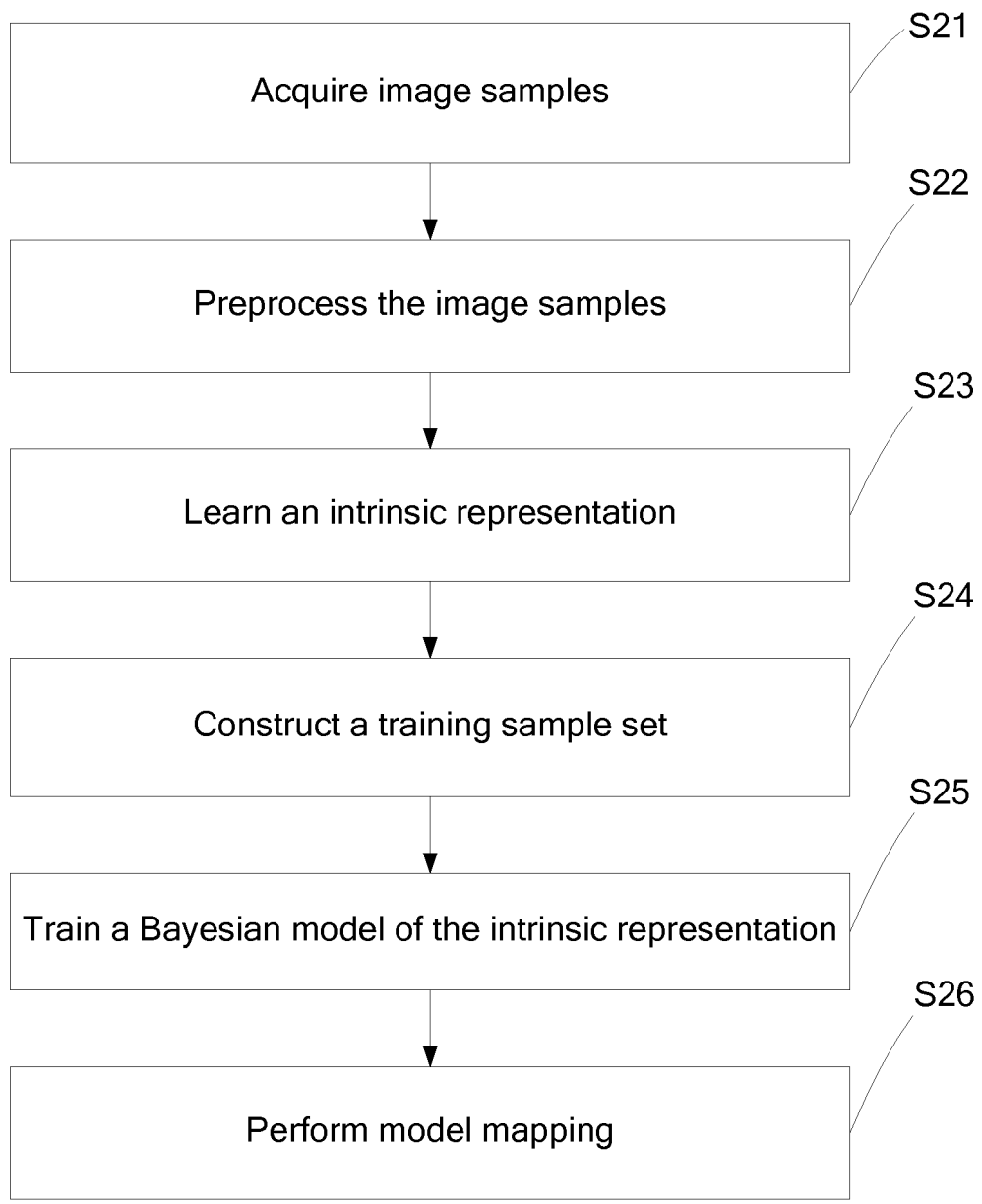
FIG. 2 is a flowchart of a method for generating a facial feature verification model according to another embodiment of the present disclosure.

As shown in FIG. 2, the method for generating a facial feature verification model mainly includes Step S21: Acquire image samples.

In the technical field of facial recognition, acquisition of image samples is already a very mature technology. In this step, for a method for acquiring image samples, any method may be used. Original images may be acquired in a manner such as photographing with a camera or recording with a video recorder. For a manner of processing the original images to obtain image samples, reference may also be made to related solutions. No further details are provided herein again.

Step S22: Preprocess the image samples.

In this step, the image samples acquired in step S21 are preprocessed, to obtain a face sample library.

In an embodiment of the present disclosure, preprocessing of the image samples may include the following steps: (1) obtaining a facial image with a size being W×H from an image sample, where W and H are positive integers, and a unit is a quantity of pixels, (2) performing registration and alignment on the obtained facial image with several standard templates, and (3) extracting a digital feature of the facial image on which the registration and alignment have been performed, to form a digital vector having D dimensions, where D is a positive integer.

Steps (1), (2), and (3) are repeated on each image sample. The face sample library is a set of obtained digital vectors of all images and identities of persons corresponding to all the images.

Next, face samples in the face sample library are grouped. For face samples in the face sample library that belong to a same person, a quantity of groups is determined. It may be understood that whether face samples in the face sample library belong to a same person may be determined in a manner of manual determining, or using any other manner. For example, an identification (ID) number of a person may be marked in an image sample. A same ID number represents a same person, and different ID numbers represent different persons.

Step S23: Learn an intrinsic representation.

A manifold relevance determination (MRD) model is extended to obtain an intrinsic representation of samples of each person.

Under different photographing environments, changes of factors such as illumination, expression, age, and the like sometimes may affect accuracy of facial recognition. A main objective of learning of an intrinsic representation is to reduce adverse impacts caused by the foregoing factors on a facial recognition model.

In an embodiment of the present disclosure, a set $X_i$ of all face samples that belong to a same person (which may be the $i^{th}$ person in a sorted order, where i is a positive integer) is equally divided into c portions, where c is a positive integer, and an operation of learning an intrinsic representation is not performed on extra samples. In a specific example, for example, there are in total 1215 face samples of a person having an ID number 3, and the face samples are divided into 60 portions; in this case, c=60, and each portion includes 20 face samples, and a subsequent operation is not performed on the rest 15 samples. Any one of the equal portions is denoted as $X_i=\{X_i^1, \ldots, X_i^c\}$, $X_i^j$, $j=1, \ldots, c$, a quantity of samples included in each equal portion is $n_i$, and then a quantity of data dimensions of each equal portion is $n_i \times D$. A lower dimension intrinsic representation of the $i^{th}$ person is denoted as $Z_i$ (a quantity of dimensions is $n_i \times Q$, $Q \gg D$).

A mapping function $F^{i,j}=\{f_d^{i,j}\}_{d=1}^D:Z_i \to X_i^j$ between an intrinsic representation and an original feature representation may be constructed, where $x_{nd}^{i,j}=f_d^{i,j}(z_n^i)+\epsilon_{nd}^{i,j}$, and $x_{nd}^{i,j}$ represents the dth dimension of the nth ($1 \leq n \leq n_i$) sample in the jth portion of samples. By means of a Gaussian process (GP) that has a mean value function being 0 and a covariance function being $$k^{i,j}(z_a^i, z_b^i) = (\sigma^{i,j})^2 \exp\left(-\frac{1}{2}\sum_{q=1}^{Q} w_q^{i,j}(z_{aq}^i - z_{bq}^i)^2\right),$$

a function $F^{i,j}$ may be selected through independent sampling.

The Gaussian process refers to a set of such random variables. When a finite quantity of random variables in the set are selected, joint distribution of the finite quantity of random variables is Gaussian distribution. The Gaussian process is determined by two parameters m, K, where m is a mean value function, and K is a covariance function. reference may be made to M. Ebden, "Gaussian Processes for Regression: A Quick Introduction", 2008.

The following likelihood function can be obtained according to the foregoing steps $p(X_i^1, \ldots, X_i^c|Z_i, \theta^{X_i}) = \prod_{j=1}^c \int p(X_i^j|F^{i,j})p(F^{i,j}|Z_i, w^{i,j}, \theta^{i,j}) dF^{i,j}$ Herein, $\theta^{X_i}=\{w^{i,1}, \ldots, w^{i,c}, \theta^{i,1}, \ldots, \theta^{i,c}\}$; $w^{i,j}=\{w_q^{i,j}\}_{q=1}^Q$ becomes an automatic relevance determination (ARD) weight. Distribution $p(F^{i,j}|Z_i, w^{i,j}, \theta^{i,j})$ may be modeled by using a product of a series of Gaussian processes that have a parameter $k^{i,j}$. Therefore, in a case in which a prior distribution $p(Z_i|\theta^{Z_i})$ of an intrinsic representation $Z_i$ is given, a likelihood function of the sample set $\{X_i^1, \ldots, X_i^c\}$ may be expressed as $p(X_i^1, \ldots, X_i^c|\theta^{X_i}, \theta^{Z_i}) = \int p(X_i^1, \ldots, X_i^c|Z_i, \theta^{X_i}) p(Z_i|\theta^{Z_i})dZ_i$.

The likelihood function is mainly used to determine an effect of a training model. Values that are obtained by the likelihood function according to different variables may be used to indicate quality of a training model.

The following steps may be used to construct an intrinsic representation. (1) A solution when $p(X_i^1, \ldots, X_i^c|\theta^{X_i}, \theta^{Z_i})$ is maximized, an intrinsic representation of samples, and corresponding parameters $\{Z_i, \theta^{X_i}, \theta^{Z_i}\}$ may be obtained by using an MRD method. For a specific MRD method, reference may be made to "A. C. Damianou, Carl Henrik Ek, Michalis K. Tistias, Neil D. Lawrence, "Manifold Relevance Determination", International Conference on Machine Learning (ICML), 2012.", and no further details are provided herein again.

(2) The obtained $Z_i$ is resolved into $Z_i=(Z_i^S, Z_i^1, \ldots, Z_i^c)$, where $Z_i^j$ is a private intrinsic representation corresponding to $X_i^j$, and $Z_i^S$ is a common intrinsic representation of all c portions of samples. Components of $Z_i^S$ are formed by all q components, in Q dimensions of $Z_i$, that satisfy a weight $w_q^{i,1}, \ldots, w_q^{i,c} > \delta (1 \leq q \leq Q)$ of automatic relevance determination (ARD). $Z_i^j$ is formed by all q components that satisfy $w_q^{i,j} > \delta$, $w_q^{i,1} \ldots, w_q^{i,j-1}, w_q^{i,j+1}, \ldots, w_q^{i,c} < \delta$. Herein, $\delta$ is a threshold selected by a user. A quantity of dimensions of $Z_i^S$ is denoted as $Q_S^i$.

For each person, (1) and (2) are repeated. An intrinsic representation set $Z_1^s, \ldots, Z_M^S$ is obtained, and quantities of dimensions corresponding to elements in the set are respectively $Q_S^1, \ldots, Q_S^M$. $Q_S=\min(Q_S^1, \ldots, Q_S^M)$ is denoted; for $Z_j^s$, ARD weights corresponding to each dimension are sorted in descending order, and first $Q_S$ components are kept. The sorted intrinsic representation set is denoted as $T_1^s, \ldots, T_M^S$, where $T_i=[t_1^i, \ldots, t_{n_i}^i] \in \mathbb{R}^{n_i \times Q_s}$ is formed by $n_i$ samples.

Step S24: Construct a training sample set.

The training sample set is a set of several samples. The set is used to perform training of a pattern determination model. In subsequent use, the training sample set may also be written as a training set in short.

For any intrinsic representation sample $t_n^i$ in samples $t_1^i, \ldots, t_{n_i}^i$ in $T_i$, corresponding c samples $x_n^{i,1}, \ldots, x_n^{i,j}, \ldots, x_n^{i,c}$ may be found in original samples, where $x_n^{i,j} \in X_i^j$. In this way, for samples of the $i^{th}$ person, the following correspondence may be established $$(t_1^i, x_1^{i,1}), \ldots\ldots, (t_1^i, x_1^{i,j}), \ldots\ldots, (t_1^i, x_1^{i,c})$$
$$\vdots \qquad \vdots \qquad \vdots$$
$$(t_n^i, x_n^{i,1}), \ldots\ldots, (t_n^i, x_n^{i,j}), \ldots\ldots, (t_n^i, x_n^{i,c})$$
$$\vdots \qquad \vdots \qquad \vdots$$
$$(t_{n_i}^i, x_{n_i}^{i,1}), \ldots\ldots, (t_{n_i}^i, x_{n_i}^{i,j}), \ldots\ldots, (t_{n_i}^i, x_{n_i}^{i,c})$$

Based on the correspondence, the following training samples may be constructed $t^k = [t_a^{i_a}, t_b^{i_b}] \in \mathbb{R}^{2Q_s}$, $k=1, \ldots, K$, and $x^k = [x_a^{i_a j_a}, x_b^{i_b j_b}] \in \mathbb{R}^{2D}$, $k=1, \ldots, K$.

$t^k$, $x^k$ are in a one-to-one correspondence. The samples are used to construct positive and negative intrinsic training sample sets $\Pi_T^+ = \{t^k | i_a = i_b\}$, $\Pi_T^- = \{t^k | i_a \neq i_b\}$, and corresponding positive and negative original training sample sets $\Pi_X^+ = \{x^k | i_a = i_b\}$, $\Pi_X^+ = \{x^k | i_a \neq i_b\}$. Similarly, $\Pi_T^+$ and $\Pi_X^+$ are in a one-to-one correspondence, and elements in $\Pi_T^-$ and $\Pi_X^-$ are in a one-to-one correspondence. Positive training samples represent a same person, and negative training samples represent different persons.

Step S25: Train a Bayesian model of an intrinsic representation.

A random variable corresponding to an intrinsic representation is denoted as $t \in \mathbb{R}^{2Q_s}$. Gaussian mixture models (GMM) $p(t|\Omega_I) = \Sigma_{l=1}^L \lambda_l \mathcal{N}(t|\mu_+^l, \Sigma_+^l)$ and $p(t|\Omega_E) = \Sigma_{s=1}^S \xi_s \mathcal{N}(t|\mu_-^s, \Sigma_-^s)$ may be trained by using an expectation-maximization (EM) algorithm according to the positive sample set $\Pi_T^+$ and the negative sample set $\Pi_T^-$ of the intrinsic representation.

It is assumed that sample data is obtained by sampling of a GMM distribution model, and EM is a method for estimating a parameter of a GMM model. For a specific EM algorithm, reference may be made to "Yaniv Taigman, Ming Yang, Marc Aurelio Ranzato, Lior Wolf, "DeepFace: Closing the Gap to Human-Level Performance in Face Verification", Computer Vision and Pattern Recognition (CVPR), 2014. A Gaussian mixture model is such a kind of model: a density function of a random variable is a probability model of a linear combination of multiple Gaussian density functions that have different parameters, and the parameters of the Gaussian density functions are formed by linear weighted factors $a_1, \ldots, a_M$, mean values $u_1, \ldots, u_M$, and covariance matrices $\Sigma_1, \ldots, \Sigma_M$, where $a_1 + \ldots + a_M = 1$.

Parameter sets $\theta^+ = (L, \lambda_1, \ldots, \lambda_L, \mu_+^1, \ldots, \mu_+^L, \Sigma_+^1, \ldots, \Sigma_+^L)$ and $\theta^- = (T, \xi_1, \ldots, \xi_S, \mu_-^1, \ldots, \mu_-^S, \Sigma_-^1, \ldots, \Sigma_-^S)$ are obtained.

Step S26: Perform model mapping.

A Bayesian model of an original sample is obtained by means of Gaussian process regression (GPR). The Gaussian process regression refers to a method that uses a Gaussian process to perform modeling on existing data, and uses an obtained model to perform related prediction and determining on newly input data.

According to a mapping $F^{i,j}: Z_i \rightarrow X_i^j$, a function $\Pi_T^+ \mapsto \Pi_X^+$ may be constructed. By means of the GPR, a distribution function, learned by using the training set $\Pi_T^+$, of an intrinsic sample pair t can be mapped to a distribution function, determined by $\Pi_X^+$, of an original feature sample pair x. In a case in which an ARD covariance function of a given Gaussian process is $$\hat{k}(t^a, t^b) = \sigma_f^2 \exp\left(-\frac{1}{2} \sum_{q=1}^{2Q_S} w_q (t_q^a - z_q^b)^2\right) + \sigma_\epsilon^2 \delta(t^a, t^b),$$

if a random variable t satisfies distribution $\mathcal{N}(\mu_T, \Sigma_T)$, after mapping is performed, a random variable x is used to perform approximation by using the distribution $\mathcal{N}(\mu_x, \Sigma_x)$, where $\mu_x = C\bar{k}$ $$\Sigma_x = (\bar{k} - Tr(K^{-1}\bar{K}))I + C(\bar{K} - \bar{k}\bar{k}^T)C^T$$

$$C = [x^1, \ldots, x^K]K^{-1}$$

$$\bar{k} = \mathbb{E}[k], \bar{K} = \mathbb{E}[kk^T]$$

$$k = [\hat{k}(t^1, t), \ldots, \hat{k}(t^K, t)]^T$$

$$K = [\hat{k}(t^a, t^b)]_{a,b=1 \ldots K}$$

$$\bar{k} = \hat{k}(\mu_T, \mu_T).$$

By using the foregoing mapping relationship, two GMM probability distribution models that are obtained through learning by using the EM method are respectively mapped to $p(x|\Omega_I) = \Sigma_{l=1}^L \lambda_l \mathcal{N}(x|\mu_{x+}^l, \Sigma_{x+}^l)$ and $p(x|\Omega_E) = \Sigma_{t=1}^T \xi_l \mathcal{N}(x|\mu_{x-}^t, \Sigma_{x-}^t)$.

Herein, $p(x|\Omega_E)$ and $p(x|\Omega_I)$ both depend on parameters of $\hat{k}$: $\theta^{\mathcal{K}} = \{w_1, \ldots, w_{2Q_s}, \sigma_f^2, \sigma_\epsilon^2\}$. The following steps need to be performed to determine $p(x|\Omega_I)$. A Leave-set-out (LSO) likelihood function $\mathcal{L}_{LSO}(\theta \mathcal{N}) = \Sigma_{l=1}^L \Sigma_{k \in I_l} \ln(\Sigma_{l' \neq l} \lambda_{l'} \mathcal{N}(x^k|\mu_{x+}^{l'}, \Sigma_{x+}^{l'}))$ is constructed by using the training sample $\Pi_X^+$, where $I_l = \{k | f(t^k) = x^k, p(t^k|\mu_+^l, \Sigma_+^l) = \max\{p(z^k|\mu_+^1, \Sigma_+^1), \ldots, p(z^k|\mu_+^L, \Sigma_+^L)\}$.

A function $\mathcal{L}_{LSO}$ is maximized to a corresponding parameter $\theta$ by using a conjugate gradient descent method. $p(x|\Omega_I)$ is calculated by using determined $\theta$. $\Pi_T^-$ and $\Pi_X^-$ are used to determine $p(x|\Omega_E)$ by using a same method.

In an embodiment of the present disclosure, for the conjugate gradient descent method, reference may be made to Nabney, I., "Netlab: algorithms for pattern recognition", Springer, 2002.

In an application of the present disclosure, after models $p(x|\Omega_E)$ and $p(x|\Omega_I)$ are obtained, for two given faces, the following two steps are used to perform face verification testing. (1) Preprocess image samples to obtain digital features $x_1$, $x_2$ of two images, being denoted as $x^* = [x_1, x_2]$.

(2) Calculate $$s(x^*) = \log\left(\frac{p(x^* | \Omega_I)}{p(x^* | \Omega_E)}\right),$$

and if s(x*)>0, the two facial images come from a same person; otherwise, the two faces represent different persons.

Figure 3:
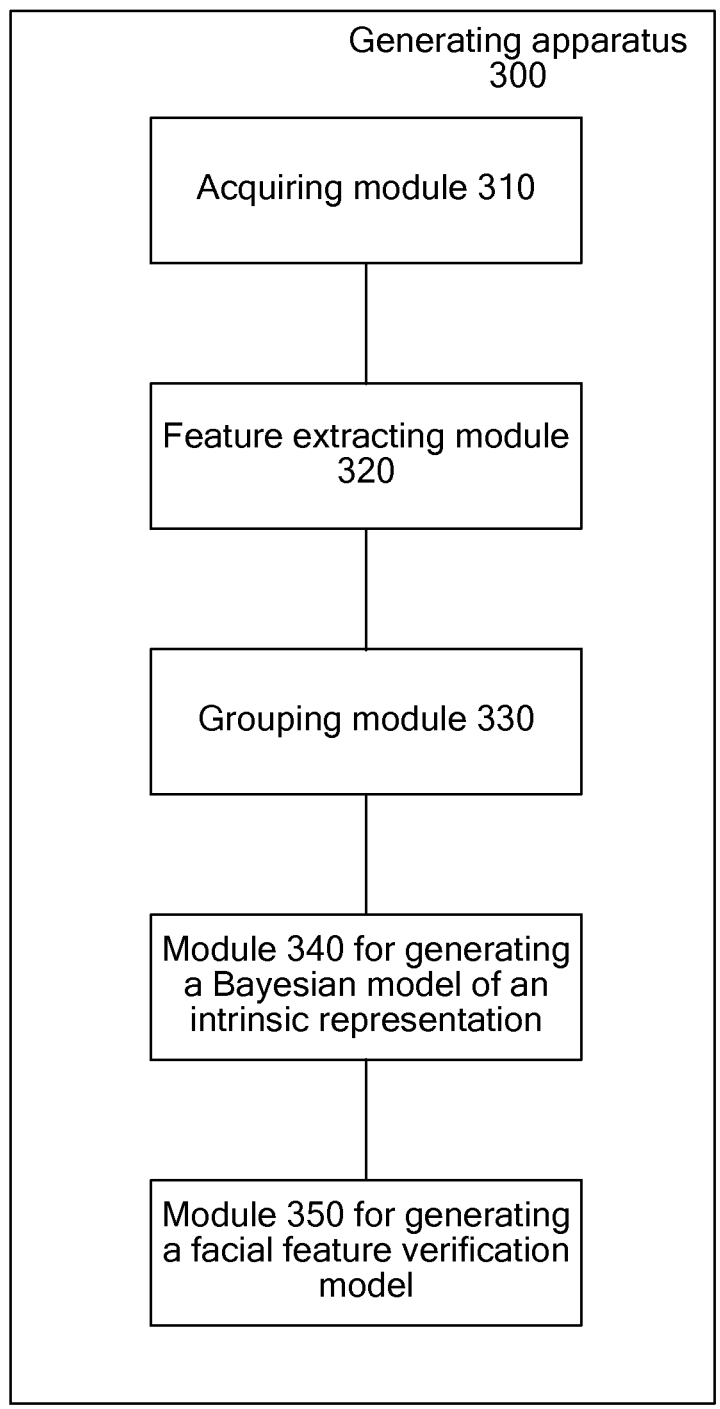
FIG. 3 is a structural diagram of an apparatus for generating a facial feature verification model according to an embodiment of the present disclosure.

An apparatus 300 for generating a facial feature verification model in an embodiment of the present disclosure is described below with reference to FIG. 3. As shown in FIG. 3, the apparatus 300 for generating a facial feature verification model includes an acquiring module 310 configured to acquire N input facial images, where the N input facial images correspond to M persons with independent identities, N is an integer greater than 2, and M is an integer greater than 2, a feature extracting module 320 configured to perform feature extraction on the N input facial images, to obtain an original feature representation of each facial image, and form a face sample library according to obtained original feature representations, a grouping module 330 configured to group samples corresponding to one person with an independent identity in the face sample library, to obtain c groups of face samples, where c is an integer greater than or equal to 2, a module 340 for generating a Bayesian model of an intrinsic representation configured to, for samples of each person with an independent identity, obtain a common intrinsic representation of the c groups of face samples according to manifold relevance determination, obtain a training sample set of an intrinsic representation according to the obtained common intrinsic representation of the c groups of face samples, and train the training sample set of the intrinsic representation, to obtain a Bayesian model of the intrinsic representation, and a module 350 for generating a facial feature verification model configured to obtain a facial feature verification model according to a preset model mapping relationship and the Bayesian model of the intrinsic representation.

In an embodiment of the present disclosure, the module 340 for generating a Bayesian model of an intrinsic representation is configured to, for the samples of each person with an independent identity, obtain, according to a preset likelihood function and the manifold relevance determination, a private intrinsic representation of each group of face samples in the c groups of face samples and the common intrinsic representation of the c groups of face samples, where a quantity of face samples in each group of the c groups of face samples is the same, obtain the training sample set of the intrinsic representation according to the obtained common intrinsic representation of the c groups of face samples, and train the training sample set of the intrinsic representation, to obtain the Bayesian model of the intrinsic representation.

In an embodiment of the present disclosure, the module 340 for generating a Bayesian model of an intrinsic representation is configured to, for the samples of each person with an independent identity, obtain the common intrinsic representation of the c groups of face samples according to the manifold relevance determination, obtain a positive training sample set and a negative training sample set according to the obtained common intrinsic representation of the c groups of face samples, where one training sample pair in the positive training sample set comes from a same person, and one training sample pair in the negative training sample set comes from different persons, and train the positive training sample set and the negative training sample set, to obtain the Bayesian model of the intrinsic representation.

In an embodiment of the present disclosure, the module 340 for generating a Bayesian model of an intrinsic representation is configured to, for the samples of each person with an independent identity, obtain the common intrinsic representation of the c groups of face samples according to the manifold relevance determination, obtain the training sample set of the intrinsic representation according to the obtained common intrinsic representation of the c groups of face samples, and train the training sample set of the intrinsic representation according to an expectation-maximization algorithm, to obtain the Bayesian model of the intrinsic representation. In an embodiment of the present disclosure, the module 350 for generating a facial feature verification model is configured to map the Bayesian model of the intrinsic representation by means of Gaussian process regression of the preset model mapping relationship, to obtain a Bayesian model of an original feature representation, where the Bayesian model of the original feature representation is the facial feature verification model.

In the apparatus 300 for generating a facial feature verification model in this embodiment of the present disclosure, a model that is obtained through learning of an intrinsic representation has strong representability and discrimination performance during processing of intra-class and inter-class changes of posture, illumination, expression, age, and the like under different photographing scenarios; a learning model has a low error rate in facial image verification, and is close to an identification level of a human eye in a standard Internet image test; the model has low complexity and a small calculation amount.

It may be clearly understood by a person skilled in the art that, for the purpose of convenient and brief description, for a detailed working process of the foregoing module, reference may be made to a corresponding process in the foregoing method embodiments, and details are not described herein again.

In the embodiments provided in this application, it should be understood that the module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional modules and units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for generating a facial feature verification model, wherein the method comprises:
    acquiring N input facial images, wherein the N input facial images correspond to M persons with independent identities, wherein N is an integer greater than 2, and wherein M is an integer greater than 2;
    performing feature extraction on the N input facial images to obtain an original feature representation of each facial image;
    forming a face sample library according to the original feature representations;
    grouping samples corresponding to one person with an independent identity in the face sample library to obtain c groups of face samples, wherein c is an integer greater than or equal to 2;
    obtaining a common intrinsic representation of the c groups of face samples for samples of each person with an independent identity according to manifold relevance determination;
    obtaining a training sample set of an intrinsic representation according to the common intrinsic representation of the c groups of face samples of the person with an independent identity;
    training the training sample set of the intrinsic representation; to obtain a Bayesian model of the intrinsic representation; and
    obtaining a facial feature verification model according to a preset model mapping relationship and the Bayesian model of the intrinsic representation.

2. The method for generating the facial feature verification model according to claim 1, wherein obtaining the common intrinsic representation of the c groups of face samples according to the manifold relevance determination comprises the same quantity of face samples in each group of the c groups of face samples, and wherein obtaining, according to the preset likelihood function and the manifold relevance determination, the private intrinsic representation of each group of face samples in the c groups of face samples and the common intrinsic representation of the c groups of face samples.

3. The method for generating the facial feature verification model according to claim 1, wherein obtaining the training sample set of the intrinsic representation according to the common intrinsic representation of the c groups of face samples comprises obtaining:
    a positive training sample set wherein one training sample pair in the positive training sample set comes from the same person; and
    a negative training sample set according to an obtained common intrinsic representation of the c groups of face samples, wherein one training sample pair in the negative training sample set comes from different persons, and wherein training the training sample set of the intrinsic representation to obtain the Bayesian model of the intrinsic representation comprises training the positive training sample set and the negative training sample set, to obtain the Bayesian model of the intrinsic representation.

4. The method for generating the facial feature verification model according to claim 1, wherein training the training sample set of the intrinsic representation to obtain the Bayesian model of the intrinsic representation comprises training the training sample set of the intrinsic representation according to an expectation-maximization algorithm, to obtain the Bayesian model of the intrinsic representation.

5. The method for generating the facial feature verification model according to claim 1, wherein obtaining the facial feature verification model according to the preset model mapping relationship and the Bayesian model of the intrinsic representation comprises mapping the Bayesian model of the intrinsic representation by means of Gaussian process regression of the preset model mapping relationship, to obtain a Bayesian model of an original feature representation, wherein the Bayesian model of the original feature representation is the facial feature verification model.

6. An apparatus for generating the facial feature verification model, wherein the apparatus comprises:
    an acquiring module configured to acquire N input facial images, wherein the N input facial images correspond to M persons with independent identities, wherein N is an integer greater than 2, and wherein M is an integer greater than 2;
    a feature extracting module configured to perform feature extraction on the N input facial image to obtain an original feature representation of each facial image;
    form a face sample library according to the original feature representations;
    a grouping module configured to group samples corresponding to one person with an independent identity in the face sample library to obtain c groups of face samples, wherein c is an integer greater than or equal to 2; and
    a module for generating a Bayesian model of an intrinsic representation configured to:
    obtain a common intrinsic representation of the c groups of face samples for samples of each person with the independent identity according to manifold relevance determination;
    obtain a training sample set of an intrinsic representation according to the common intrinsic representation of the c groups of face samples; and
    train the training sample set of the intrinsic representation to obtain the Bayesian model of the intrinsic representation, wherein the module for generating the facial feature verification model configured to obtain the facial feature verification model according to a preset model mapping relationship and the Bayesian model of the intrinsic representation.

7. The apparatus for generating the facial feature verification model according to claim 6, wherein the module for generating the Bayesian model of the intrinsic representation is configured to:
    obtain, according to a preset likelihood function and the manifold relevance determination, a private intrinsic representation of each group of face samples in the c groups of face samples and the common intrinsic representation of the c groups of face samples for the samples of each person with an independent identity, wherein a quantity of face samples in each group of the c groups of face samples is the same;

obtain the training sample set of the intrinsic representation according to the common intrinsic representation of the c groups of face samples; and train the training sample set of the intrinsic representation to obtain the Bayesian model of the intrinsic representation.

8. The apparatus for generating the facial feature verification model according to claim 6, wherein the module for generating the Bayesian model of the intrinsic representation is configured to:

obtain the common intrinsic representation of the c groups of face samples for the samples of each person with an independent identity according to the manifold relevance determination;

obtain a positive training sample set and a negative training sample set according to the obtained common intrinsic representation of the c groups of face samples, wherein one training sample pair in the positive training sample set comes from the same person, and wherein one training sample pair in the negative training sample set comes from different persons; and train the positive training sample set and the negative training sample set to obtain the Bayesian model of the intrinsic representation.

9. The apparatus for generating the facial feature verification model according to claim 6, wherein the module for generating the Bayesian model of the intrinsic representation is configured to:

obtain the common intrinsic representation of the c groups of face samples for the samples of each person with an independent identity according to the manifold relevance determination;

obtain the training sample set of the intrinsic representation according to the common intrinsic representation of the c groups of face samples; and train the training sample set of the intrinsic representation according to an expectation-maximization algorithm to obtain the Bayesian model of the intrinsic representation.

10. The apparatus for generating the facial feature verification model according to claim 6, wherein the module for generating the facial feature verification model is configured to map the Bayesian model of the intrinsic representation by means of Gaussian process regression of the preset model mapping relationship to obtain a Bayesian model of an original feature representation, wherein the Bayesian model of the original feature representation is the facial feature verification model.

* * * * *